United States Patent
Marri et al.

(10) Patent No.: US 10,184,088 B2
(45) Date of Patent: Jan. 22, 2019

(54) FLUID CATALYTIC CRACKING PROCESS AND APPARATUS FOR MAXIMIZING LIGHT OLEFINS OR MIDDLE DISTILLATES AND LIGHT OLEFINS

(71) Applicant: Lummus Technology Inc., Bloomfield, NJ (US)

(72) Inventors: Rama Rao Marri, Katy, TX (US); Dalip Singh Soni, Houston, TX (US); Pramod Kumar, Gurgaon (IN)

(73) Assignee: Lummus Technology Inc., Bloomfield, NJ (US)

( * ) Notice: Subject to any disclaimer, the term of this patent is extended or adjusted under 35 U.S.C. 154(b) by 202 days.

(21) Appl. No.: 15/275,802

(22) Filed: Sep. 26, 2016

(65) Prior Publication Data

US 2017/0009150 A1  Jan. 12, 2017

Related U.S. Application Data

(62) Division of application No. 13/547,807, filed on Jul. 12, 2012, now Pat. No. 9,452,404.

(51) Int. Cl.
*C10G 51/02* (2006.01)
*B01J 8/18* (2006.01)
(Continued)

(52) U.S. Cl.
CPC .......... *C10G 51/026* (2013.01); *B01J 8/0015* (2013.01); *B01J 8/0055* (2013.01); *B01J 8/1809* (2013.01);
(Continued)

(58) Field of Classification Search
CPC .... C10G 51/026; C10G 11/182; C10G 11/18; C10G 11/187; C10G 51/06;
(Continued)

(56) References Cited

U.S. PATENT DOCUMENTS

| 4,717,466 A | 1/1988 | Herbst et al. |
| 4,871,446 A | 10/1989 | Herbst et al. |

(Continued)

FOREIGN PATENT DOCUMENTS

| CN | 1626623 A | 6/2005 |
| CN | 102086402 A | 6/2011 |

(Continued)

OTHER PUBLICATIONS

Examination Report issued in GCC Application No. GC2013-24947; dated Feb. 28, 2017 (3 pages).
(Continued)

*Primary Examiner* — Randy Boyer
*Assistant Examiner* — Juan C Valencia
(74) *Attorney, Agent, or Firm* — Osha • Liang LLP

(57) ABSTRACT

A fluid catalytic cracking apparatus and process is disclosed, providing for efficient conversion of heavy hydrocarbon feeds to light olefins, aromatics, and gasoline. A countercurrent flow reactor operating in bubbling or turbulent fluidization regimes is integrated with a fluid catalytic cracking riser reactor. A heavy hydrocarbon feed is catalytically cracked to naphtha and light olefins in the riser reactor, a co-current flow reactor. To enhance the yields and selectivity to light olefins, cracked hydrocarbon products from the riser reactor, such as $C_4$ and naphtha range hydrocarbons, may be recycled and processed in the countercurrent flow reactor. The integration of the countercurrent flow reactor with a conventional FCC riser reactor and catalyst regeneration system may overcome heat balance issues commonly associated with two-stage cracking processes, may substantially increase the overall conversion and light olefins yield, and/or may increases the capability to process heavier feedstocks.

20 Claims, 1 Drawing Sheet

(51) Int. Cl.
  *B01J 8/26* (2006.01)
  *B01J 8/00* (2006.01)
  *C10G 51/06* (2006.01)
  *C10G 11/18* (2006.01)

(52) U.S. Cl.
  CPC ............ *B01J 8/1827* (2013.01); *B01J 8/26* (2013.01); *C10G 11/18* (2013.01); *C10G 11/182* (2013.01); *C10G 11/187* (2013.01); *C10G 51/06* (2013.01); *B01J 2208/00769* (2013.01); *C10G 2300/107* (2013.01); *C10G 2300/1044* (2013.01); *C10G 2300/1074* (2013.01); *C10G 2300/1077* (2013.01); *C10G 2300/70* (2013.01); *C10G 2400/02* (2013.01); *C10G 2400/04* (2013.01); *C10G 2400/20* (2013.01); *C10G 2400/30* (2013.01)

(58) Field of Classification Search
  CPC ............ C10G 2400/04; C10G 2300/70; C10G 2300/1044; C10G 2300/107; C10G 2300/1074; C10G 2300/1077; C10G 2400/02; C10G 2400/20; C10G 2400/30; B01J 8/0015; B01J 8/1827; B01J 8/26; B01J 8/0055; B01J 8/1809; B01J 2208/00769
  See application file for complete search history.

(56) References Cited

U.S. PATENT DOCUMENTS

| | | |
|---|---|---|
| 4,874,503 A | 10/1989 | Herbst et al. |
| 4,892,643 A | 1/1990 | Herbst et al. |
| 4,966,681 A | 10/1990 | Herbst et al. |
| 5,944,982 A | 8/1999 | Lomas |
| 6,106,697 A | 8/2000 | Swan et al. |
| 6,514,403 B1 | 2/2003 | Louie et al. |
| 6,869,521 B2 | 3/2005 | Lomas |
| 7,077,998 B2 | 7/2006 | Wu et al. |
| 7,128,827 B2 | 10/2006 | Tallman et al. |
| 7,323,099 B2 | 1/2008 | Henry |
| 7,479,218 B2 | 1/2009 | Letzsch |
| 7,611,622 B2 | 11/2009 | Niccum et al. |
| 7,658,837 B2 | 2/2010 | Soares Cerqueira et al. |
| 2005/0161369 A1 | 7/2005 | Soni et al. |
| 2006/0231461 A1 | 10/2006 | Mo et al. |
| 2007/0205139 A1 | 9/2007 | Kulprathipanja et al. |
| 2008/0011645 A1* | 1/2008 | Dean ............... C10G 11/182 208/113 |

FOREIGN PATENT DOCUMENTS

| | | |
|---|---|---|
| WO | 2010067379 A2 | 6/2010 |
| WO | 2012004809 A1 | 1/2012 |

OTHER PUBLICATIONS

First Office Action (with translation) dated Oct. 20, 2015 in corresponding Chinese application No. 201380040331.1 (11 pages).
Correspondence reporting an Office Action dated Jun. 22, 2016 in corresponding Columbian application No. 15/023.410 (18 pages).
Correspondence reporting an Office Action issued in corresponding Columbian application No. 15-023.410 9 (16 pages).
Written Opinion issued in Chilean Application No. 201500086 dated Jul. 7, 2017 (9 pages).
Notification of Reason for Refusal dated Jan. 17, 2017 in corresponding Japanese application No. 2015-521775 (w/translation) (8 pages).
Office Action issued in corresponding Indian Application No. 43/MUMNP/2015 dated Jul. 26, 2018 (6 pages).

* cited by examiner

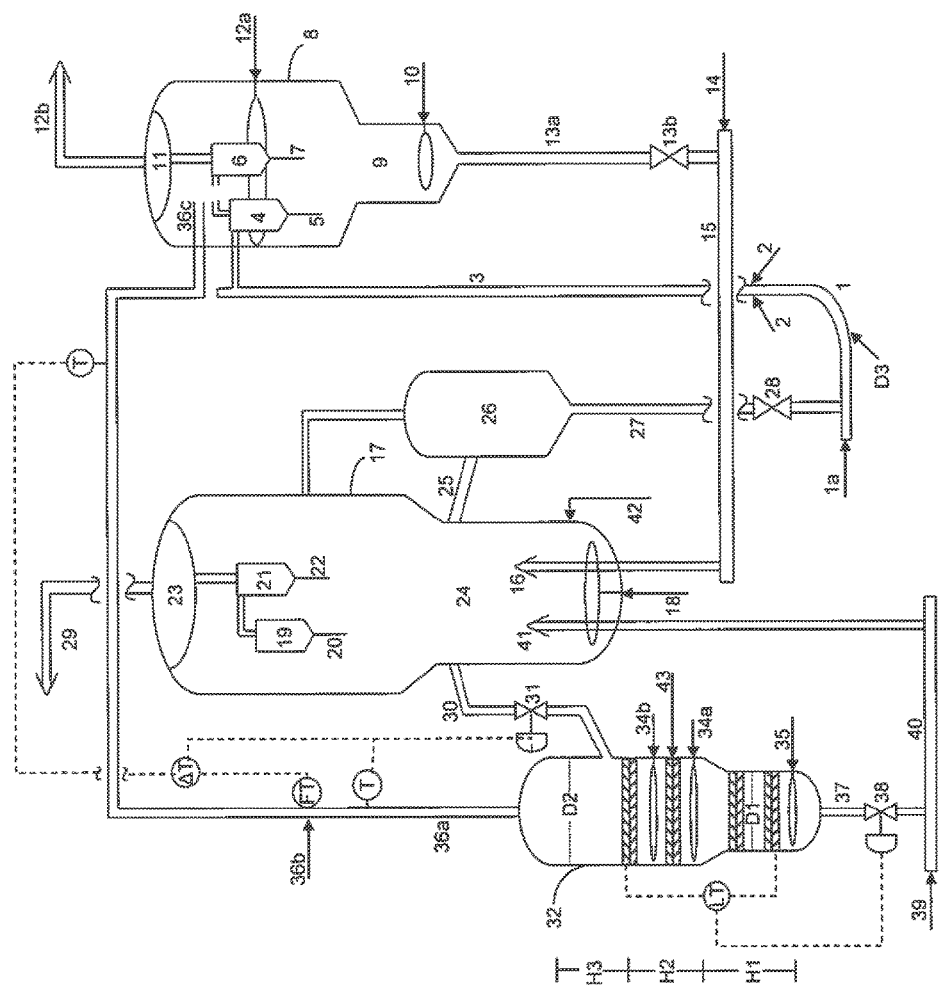

FLUID CATALYTIC CRACKING PROCESS AND APPARATUS FOR MAXIMIZING LIGHT OLEFINS OR MIDDLE DISTILLATES AND LIGHT OLEFINS

CROSS-REFERENCE TO RELATED APPLICATION

This application, pursuant to 35 U.S.C. § 120, claims benefit to U.S. patent application Ser. No. 13/547,807 filed Jul 12, 2012, now U.S. Pat. No. 9,452,404, herein incorporated by reference in its entirety.

FIELD OF THE DISCLOSURE

Embodiments disclosed herein relate generally to a fluid catalytic cracking apparatus and process for maximizing the conversion of a heavy hydrocarbon feed, such as vacuum gas oil and/or heavy oil residues into very high yield of light olefins, such as propylene and ethylene, aromatics and gasoline with high octane number.

BACKGROUND

In recent times, production of light olefins via fluid catalytic cracking (FCC) processes has been considered one of the most attractive propositions. Fuel specifications are becoming increasingly stringent due to stricter environmental regulations. Additionally, there is an ever increasing demand for petrochemical building blocks such as propylene, ethylene, and aromatics (benzene, toluene, xylenes, etc.). Further, integration of petroleum refineries with a petrochemicals complex has become a preferred option for both economic and environmental reasons. Global trends also show that there is increased demand for middle distillates (diesel) compared to that of gasoline product. Maximizing middle distillates from a typical FCC process requires operating FCC at lower reactor temperatures; it also requires utilizing different catalyst formulations. Operating at lower temperatures decreases the yield of light olefins and reduces feedstock for alkylation units.

Several fluidized bed catalytic processes have been developed over the last two decades, adapting to the changing market demands. For example, U.S. Pat. No. 7,479,218 discloses a fluidized catalytic reactor system in which a riser-reactor is divided into two sections of different radii in order to improve the selectivity for light olefins production. The first part of the riser reactor with lesser radii is employed for cracking heavy feed molecules to naphtha range. The enlarged radii portion, the second part of the riser reactor is used for further cracking of naphtha range products into light olefins such as propylene, ethylene, etc. Though the reactor system concept is fairly simple, the degree of selectivity to light olefins is limited for the following reasons: (1) the naphtha range feed streams contact partially coked or deactivated catalyst; (2) the temperature in the second part of the reaction section is much lower than the first zone because of the endothermic nature of the reaction in both sections; and (3) lack of the high activation energy required for light feed cracking as compared to that of heavy hydrocarbons.

U.S. Pat. Nos. 6,106,697, 7,128,827, and 7,323,099 employ two stage fluid catalytic cracking (FCC) units to allow a high degree of control for selective cracking of heavy hydrocarbons and naphtha range feed streams. In the $1^{st}$ stage FCC unit, consisting of a riser reactor, stripper and regenerator for converting gas oil/heavy hydrocarbon feeds into naphtha boiling range products, in the presence of Y-type large pore zeolite catalyst. A $2^{nd}$ stage FCC unit with a similar set of vessels/configuration is used for catalytic cracking of recycled naphtha streams from the $1^{st}$ stage. Of course, the $2^{nd}$ stage FCC unit employs a ZSM-5 type (small pore zeolite) catalyst to improve the selectivity to light olefins. Though this scheme provides a high degree of control over the feed, catalyst and operating window selection and optimization in a broad sense, the $2^{nd}$ stage processing of naphtha feed produces very little coke that is insufficient to maintain the heat balance. This demands heat from external sources to have adequate temperature in the regenerator for achieving good combustion and to supply heat for feed vaporization and endothermic reaction. Usually, torch oil is burned in the $2^{nd}$ stage FCC regenerator, which leads to excessive catalyst deactivation due to higher catalyst particle temperatures and hot spots.

U.S. Pat. No. 7,658,837 discloses a process and device to optimize the yields of FCC products by utilizing a part of a conventional stripper bed as a reactive stripper. Such reactive stripping concept of second reactor compromises the stripping efficiency to some extent and hence may lead to increased coke load to regenerator. The product yield and selectivity is also likely to be affected due to contact of the feed with coked or deactivated catalyst. Further, reactive stripper temperatures cannot be changed independently because the riser top temperature is directly controlled to maintain a desired set of conditions in the riser.

US2007/0205139 discloses a process to inject hydrocarbon feed through a first distributor located at the bottom section of the riser for maximizing gasoline yield. When the objective is to maximize light olefins, the feed is injected at the upper section of the riser through a similar feed distribution system with an intention to decrease the residence time of hydrocarbon vapors in the riser.

WO2010/067379 aims at increasing propylene and ethylene yields by injecting $C_4$ and olefinic naphtha streams in the lift zone of the riser below the heavy hydrocarbon feed injection zone. These streams not only improve the light olefins yield but also act as media for catalyst transport in place of steam. This concept helps in reducing the degree of thermal deactivation of the catalyst. However, this lacks in flexibility of varying operating conditions such as temperature and WHSV in the lift zone, which are critical for cracking of such light feed steams. This is likely to result in inferior selectivity to the desired light olefins.

U.S. Pat. No. 6,869,521 discloses that contacting a feed derived from FCC product (particularly naphtha) with a catalyst in a second reactor operating in fast fluidization regime is useful for promoting hydrogen transfer reactions and also for controlling catalytic cracking reactions.

U.S. Pat. No. 7,611,622 discloses an FCC process employing dual risers for converting a $C_3/C_4$ containing feedstock to aromatics. The first and second hydrocarbon feeds are supplied to the respective $1^{st}$ and $2^{nd}$ risers in the presence of gallium enriched catalyst and the $2^{nd}$ riser operates at higher reaction temperature than the first.

U.S. Pat. No. 5,944,982 discloses a catalytic process with dual risers for producing low sulfur and high octane gasoline. The second riser is used to process recycle the heavy naphtha and light cycle oils after hydro-treatment to maximize the gasoline yield and octane number.

US20060231461 discloses a process that maximizes production of light cycle oil (LCO) or middle distillate product and light olefins. This process employs a two reactor system where the first reactor (riser) is used for cracking gas oil feed into predominantly LCO and a second concurrent dense bed reactor is used for cracking of naphtha recycled from the first reactor. This process is limited by catalyst selectivity and lacks in the desired level of olefins in naphtha due to operation of the first reactor at substantially lower reaction temperatures.

SUMMARY OF THE DISCLOSED EMBODIMENT

It has been found that it is possible to use a two-reactor scheme to crack hydrocarbons, including cracking of a $C_4$, lighter $C_5$ fraction, naphtha fraction, methanol, etc for the production of light olefins, where the two-reactor scheme does not have limitations on selectivity and operability, meets heat balance requirements, and also maintains a low piece count. Select embodiments disclosed herein use a conventional riser reactor in combination with a countercurrent bubbling/turbulent fluidized bed reactor designed for maximizing light olefins production. The effluents from the riser reactor and countercurrent flow reactor are processed in a common catalyst disengagement vessel, and the catalysts used in each of the riser reactor and the countercurrent flow reactor are regenerated in a common catalyst regeneration vessel. This flow scheme is effective for maintaining a high cracking activity, overcomes the heat balance problems, and also improves yield and selectivity of light olefins from various hydrocarbon streams, yet simplifies the product quenching and unit hardware, as will be described in more detail below.

In one aspect, embodiments disclosed herein relate to a process for the catalytic cracking of hydrocarbons, including: regenerating a spent catalyst having a first cracking catalyst with a first average particle size and density and a second cracking catalyst with a second average particle size and density in a catalyst regeneration vessel to form a regenerated catalyst. The average particle size of the first cracking catalyst is less than the average particle size of the second cracking catalyst. A first hydrocarbon feed is contacted in co-current flow with a first portion of the regenerated catalyst in a riser reactor to produce a first effluent including a first cracked hydrocarbon product and a spent mixed catalyst fraction. A second portion of the regenerated catalyst is fed to a countercurrent flow reactor, where concurrently: (i) the first cracking catalyst is separated from the second cracking catalyst based on at least one of density and particle size; (ii) a second hydrocarbon feed is contacted in countercurrent flow with the second cracking catalyst to produce a second cracked hydrocarbon product; (iii) a second effluent is recovered from the countercurrent flow reactor including the second cracked hydrocarbon product and the first cracking catalyst; and (iv) a third effluent is recovered including spent second catalyst. The first effluent and the second effluent are fed to a disengagement vessel to separate the spent mixed catalyst fraction and the separated first cracking catalyst from the first and second cracked hydrocarbon products. The separated catalysts are fed from the disengagement vessel to the catalyst regeneration vessel as the spent catalyst.

In another aspect, embodiments disclosed herein relate to an apparatus for the catalytic cracking of hydrocarbons. The system may include a catalyst regeneration vessel for regenerating a spent catalyst including a first cracking catalyst having a first average particle size and density and a second cracking catalyst having a second average particle size and density to form a regenerated catalyst comprising the first cracking catalyst and the second cracking catalyst. The average particle size of the first cracking catalyst is less than the average particle size of the second cracking catalyst. The system also includes a riser reactor for contacting in co-current flow a first hydrocarbon feed with a first portion of the regenerated catalyst to produce a first effluent including a first cracked hydrocarbon product and a spent mixed catalyst fraction. A flow conduit is provided for feeding a second portion of the regenerated catalyst to a countercurrent flow reactor. The countercurrent flow reactor is configured to concurrently: (i) separate the first cracking catalyst from the second cracking catalyst based on at least one of density and particle size; (ii) contact in countercurrent flow a second hydrocarbon feed with predominantly second cracking catalyst to produce a second cracked hydrocarbon product; (iii) recover a second effluent from the countercurrent flow reactor comprising the second cracked hydrocarbon product and the first cracking catalyst; and (iv) recover a third effluent comprising spent second catalyst. A disengagement vessel is then used for separating the first effluent and the second effluent and to recover (a) a spent catalyst fraction including the spent mixed catalyst fraction and the separated first cracking catalyst and (b) an effluent including the first and second cracked hydrocarbon products. A flow conduit is also provided for feeding the spent catalyst fraction from the disengagement vessel to the catalyst regeneration vessel.

Other aspects and advantages will be apparent from the following description and the appended claims.

BRIEF DESCRIPTION OF DRAWINGS

FIG. 1 is a simplified process flow diagram of a process for cracking hydrocarbons and producing light olefins according to one or more embodiments disclosed herein.

DETAILED DESCRIPTION

In one aspect, embodiments herein relate to a fluid catalytic cracking apparatus and process for maximizing the conversion of a heavy hydrocarbon feed, such as vacuum gas oil and/or heavy oil residues into very high yield of light olefins, such as propylene and ethylene, aromatics and gasoline with high octane number or middle distillates, while concurrently minimizing the yield of heavier bottom product. To accomplish this goal, a countercurrent flow reactor operating in bubbling or turbulent fluidization regimes is integrated with a conventional fluid catalytic cracking reactor, such as a riser reactor. The heavy hydrocarbon feed is catalytically cracked to naphtha, middle distillates and light olefins in the riser reactor, which is a pneumatic flow co-current type reactor. To enhance the yields and selectivity to light olefins (ethylene and propylene), cracked hydrocarbon products from the riser reactor, such as $C_4$ and naphtha range hydrocarbons (olefins and paraffins), may be recycled and processed in the countercurrent flow reactor. Alternatively or additionally, external feed streams, such as $C_4$ fractions from other processes such as a steam cracker, metathesis reactor, or delayed coking unit, and naphtha range streams from delayed coking, visbreaking or natural gas condensates, may be processed in the countercurrent flow reactor to produce light olefins, such as ethylene and propylene. The integration of the countercurrent flow reactor with a conventional FCC riser reactor according to embodiments disclosed herein may overcome the drawbacks of prior processes, may substantially increase the overall conversion and light olefins yield, and/or may increases the capability to process heavier feedstocks.

Integration of the countercurrent flow reactor with a conventional FCC riser reactor according to embodiments disclosed herein may be facilitated by (a) using a common catalyst regeneration vessel, (b) using two types of catalyst, one being selective for cracking heavier hydrocarbons, such as vacuum gas oil, heavy vacuum gas oil, heavy residue from atmospheric tower bottoms, and the other being selective for the cracking of $C_4$ and naphtha range hydrocarbons for the production of light olefins, and (c) using a countercurrent flow reactor that will separate the two types of catalyst favoring the contact of the $C_4$s or naphtha feed with the catalyst selective for cracking the same and producing light olefins.

The first cracking catalyst may be a Y-type zeolite catalyst, an FCC catalyst, or other similar catalysts useful for cracking heavier hydrocarbon feedstocks. The second cracking catalyst may be a ZSM-5 or ZSM-11 type catalyst or similar catalyst useful for cracking $C_4$s or naphtha range hydrocarbons and selective for producing light olefins. To facilitate the two-reactor schemes disclosed herein, the first cracking catalyst may have a first average particle size and density smaller and lighter than those for the second cracking catalyst, such that the catalysts may be separated based on density and size (e.g., based on terminal velocity or other characteristics of the catalyst particles).

In the catalyst regeneration vessel, spent catalyst recovered from both the riser reactor and the countercurrent flow reactor is regenerated. Following regeneration, a first portion of the mixed catalyst may be fed from the regeneration vessel to a riser reactor (co-current flow reactor). A second portion of the mixed catalyst may be fed from the regeneration vessel to the countercurrent flow reactor.

In the co-current flow reactor, a first hydrocarbon feed is contacted with a first portion of the regenerated catalyst to crack at least a portion of the hydrocarbons to form lighter hydrocarbons. An effluent may then be recovered from the riser reactor, the effluent comprising a first cracked hydrocarbon product and a spent mixed catalyst fraction.

In the countercurrent flow reactor, the second portion of the regenerated catalyst flows into an upper portion of reactor vessel, the catalyst separation zone, contacting upward flowing hydrocarbons and steam or another stripping medium. The upward flow of the fluid components is maintained at velocity sufficient to separate the first cracking catalyst from the second cracking catalyst based on the differences in at least one of density and particle size of the two catalysts. The larger and denser catalyst, selective for cracking of the light hydrocarbon feeds flows downward and forms a dense bed of catalyst particles. The down-flowing predominantly second cracking catalyst is contacted in countercurrent flow with an up-flowing second hydrocarbon feed, the aforementioned $C_4$ or naphtha fraction, cracking the hydrocarbons and forming light olefins such as ethylene and propylene. The catalyst continues flowing downward through the reaction zone into a lower stripping zone, where the catalyst is contacted with steam or another stripping medium to strip out the cracked hydrocarbons and unreacted feed components from the second cracking catalyst. The spent second cracking catalyst is recovered from the bottom of the countercurrent flow reactor and returned to the catalyst regeneration vessel. The stripping medium, cracked hydrocarbon product, and the separated first cracking catalyst are recovered as an effluent from an upper portion of the reactor.

The second effluent (cracked hydrocarbon products and separated first cracking catalyst) from the countercurrent flow reactor outlet is transported to a disengagement vessel via pneumatic riser pipe operating in a pneumatic fluidization regime. This riser pipe can also be used to introduce additional quantity of heavy feed or re-route part of the feed from the first stage reactor (the riser reactor). This serves two purposes. First, the catalyst in the countercurrent flow reactor vapor outlet line is predominantly Y-type zeolite/conventional FCC catalyst that are preferred to crack heavy feed molecules into middle distillates (diesel) at a relatively lower reaction temperature. Lower reaction temperature (475-520° C.) is preferable to maximize middle distillates. Second, this helps in simultaneous cooling (quenching) of lighter hydrocarbon product streams from counter-current flow reactor. The cracking reaction is endothermic that helps in reducing the temperature of the outgoing product vapors and also residence time.

The first effluent (cracked hydrocarbons and spent mixed catalyst from the riser reactor) and the second effluent (cracked hydrocarbons and separated first cracking catalyst from the countercurrent flow reactor) are both fed to a disengagement vessel to separate the spent mixed catalyst fraction and the separated first cracking catalyst from the first and second cracked hydrocarbon products. The cracked hydrocarbon products, including light olefins, $C_4$ hydrocarbons, naphtha range hydrocarbons, and heavier hydrocarbons may then be separated to recover the desired products or product fractions.

Thus, processes disclosed herein integrate a countercurrent flow reactor and a riser reactor, with common product separations and catalyst regeneration, where the catalysts used in the countercurrent flow reactor is highly selective for cracking C4 and naphtha range hydrocarbons to produce light olefins. The common catalyst regeneration provides for heat balance, and the common product separation (disengagement vessel, etc.) provides for simplicity of operations and reduced piece count, among other advantages.

Referring now to FIG. 1, a simplified process flow diagram of processes for cracking hydrocarbons and producing light olefins according to embodiments disclosed herein is illustrated. The process includes a two-reactor configuration for maximizing yield of propylene and ethylene from petroleum residue feed stocks. The second reactor is a dense fluidized bed reactor equipped with baffles or internals The $C_4$ olefins and/or light naphtha from the first reactor products or similar feed streams from external sources are processed in the second reactor to enhance the yield of light olefins, including propylene and ethylene, and aromatics/high octane gasoline.

A heavy petroleum residue feed is injected through one or more feed injectors 2 located near the bottom of first riser reactor 3. The heavy petroleum feed contacts hot regenerated catalyst introduced through a J-bend 1. The catalyst, for example, can be a Y-type zeolite based catalyst, which may be used alone or in combination with other catalysts, such as ZSM-5 or ZSM-11.

The heat required for vaporization of the feed and/or raising the temperature of the feed to the desired reactor temperature, such as in the range from 500° C. to about 700° C., and for the endothermic heat (heat of reaction) may be provided by the hot regenerated catalyst coming from the regenerator 17. The pressure in first riser reactor 3 is typically in the range from about 1 barg to about 5 barg.

After the major part of the cracking reaction is completed, the mixture of products, unconverted feed vapors, and spent catalyst flow into a two stage cyclone system housed in cyclone containment vessel 8. The two-stage cyclone system includes a primary cyclone 4, for separating spent catalyst from vapors. The spent catalyst is discharged into stripper 9 through primary cyclone dip leg 5. Fine catalyst particles entrained with the separated vapors from primary cyclone 4 and product vapors from second reactor 32, introduced via flow line 36a and a single stage cyclone 36c, are separated in second stage cyclone 6. The catalyst collected is discharged into stripper 9 via dip leg 7. The vapors from second stage cyclone 6 are vented through a secondary cyclone outlet connected to plenum 11, and are then routed to a main fractionator/gas plant through reactor vapor line 12b for recovery of products, including the desired olefins. If necessary, the product vapors are further cooled by introducing light cycle oil (LCO) or steam via distributor line 12a as a quench media.

The spent catalyst recovered via dip legs 5, 7 undergoes stripping in stripper bed 9 to remove interstitial vapors (the hydrocarbon vapors trapped between catalyst particles) by countercurrent contacting of steam, introduced to the bottom of stripper 9 through a steam distributor 10. The spent catalyst is then transferred to regenerator 17 via the spent catalyst standpipe 13a and lift line 15. Spent catalyst slide valve 13b, located on spent catalyst standpipe 13a is used for controlling catalyst flow from stripper 9 to regenerator 17. A small portion of combustion air is introduced through a distributor 14 to help smooth transfer of spent catalyst.

Coked or spent catalyst is discharged through spent catalyst distributor 16 in the center of the dense regenerator bed 24. Combustion air is introduced by an air distributor 18 located at the bottom of regenerator bed 24. Coke deposited on the catalyst is then burned off in regenerator 17 via reaction with the combustion air. Regenerator 17, for example, may operate at a temperature in the range from about 640°C. to about 750°C. and a pressure in the range from about 1 barg to about 5 barg. The catalyst fines entrained along with flue gas are collected in first stage cyclone 19 and second stage cyclone 21 and are discharged into the regenerator catalyst bed through respective dip legs 20, 22. The flue gas recovered from the outlet of second stage cyclone 21 is directed to flue gas line 29 via regenerator plenum 23 for downstream waste heat recovery and/or power recovery.

A first part of the regenerated catalyst is withdrawn into a Regenerated Catalyst (RCSP) hopper 26 via withdrawal line 25, which is in flow communication with regenerator 17 and regenerated catalyst standpipe 27. The catalyst bed in the RCSP hopper 26 floats with regenerator 17 bed level. The regenerated catalyst is then transferred from RCSP hopper 26 to riser reactor 3 via regenerated catalyst standpipe 27, which is in flow communication with J-bend 1. The catalyst flow from regenerator 17 to riser reactor 3 may be regulated by a RCSP slide valve 28 located on regenerated catalyst standpipe 27. The opening of slide valve 28 is adjusted to control the catalyst flow to maintain a desired top temperature in riser reactor 3.

In addition to lift steam, a provision is also made to inject feed streams such as $C_4$ olefins and naphtha or similar external streams as a lift media to J-bend 1 through a gas distributor 1a located at the Y-section for enabling smooth transfer of regenerated catalyst from J-bend 1 to riser reactor 3, J-bend 1 may also act as a dense bed reactor for cracking $C_4$ olefins and naphtha streams into light olefins at conditions favorable for such reactions, such as a WHSV of 0.5 to 50 $h^{-1}$, a temperature of 640° C. to 750° C., and residence times from 3 to 10 seconds. J-bend 1 diameter (D3) or size is varied to achieve these conditions. The J-bend diameter may be varied between 1 to 3 times of a typical regenerated catalyst standpipe diameter, for example.

A second part of the regenerated catalyst is withdrawn into a second reactor 32 through a standpipe 30. A slide valve 31 may be used to control the catalyst flow from regenerator 17 to second reactor 32 based on a vapor outlet temperature set point. $C_4$ olefins and naphtha streams are injected into the bottom section of the catalyst bed through one or more feed distributors 34 (34a, 34b), either in liquid or vapor phase. Second reactor 32 operates in a countercurrent fashion, where the regenerated catalyst flows downward (from the top to the bottom of the reactor bed) and the feed hydrocarbon stream flows upward (from the bottom to the top of the reactor bed). This is an important feature that helps to maintain an optimal temperature profile along the length/height of second reactor 32.

Second reactor 32 may be equipped with baffles or structured internals that help intimate contact and mixing of catalyst and feed molecules. These internals may also help in minimizing channeling, bubble growth, and/or coalescence. Second reactor 32 may also be enlarged at different sections along the length to maintain constant gas superficial velocity.

After the reaction is completed, the catalyst is stripped at the bottommost portion of second reactor 32 to separate entrained hydrocarbon feed / products using steam as a stripping media introduced through distributor 35. The spent catalyst is then transferred to regenerator 17 via standpipe 37 and lift line 40 through a spent catalyst distributor 41. Combustion air may be introduced through distributor 39 to enable smooth transfer of catalyst to regenerator 17. Slide valve 38 may be used, in association with a level transmitter (LT), to control the catalyst flow from second reactor 32 to regenerator 17. Spent catalyst from both reactors 3, 32 is then regenerated in the common regenerator 17, operating in a complete combustion mode.

Second reactor 32 utilizes two different catalyst particles, including a lighter and smaller Y-type zeolite or FCC catalyst and a larger and denser ZSM-5/ZSM-11 shape selective pentacil small pore zeolite. For example, the Y-type zeolite or FCC catalyst may have a particle size in the range from about 20-120 microns, while the ZSM-5/ZSM-11 catalyst may have a particle size in the range from about 80 to about 200 microns. The superficial gas velocity in second reactor 32 is such that the Y-type zeolite/FCC catalyst is ejected out of the reactor such that second reactor 32 preferentially retains ZSM-5 type catalyst within the bed, due to differences in single particle terminal velocity or differences between minimum fluidization/minimum bubbling velocities. The smaller and lighter Y-type zeolite/FCC catalyst is then transported from second reactor 32 to the common disengager or containment vessel 8, housing the riser reactor cyclones and/or reaction termination system, via outlet line 36a.

A hydrocarbon feed such as heavy vacuum gas oil, atmospheric tower bottoms, heavy hydrocarbon residue feed, light cycle oil (LCO), and/or steam may be injected as a quench media in the outlet line 36a through a distributor 36b. The flow rate of such quench media may be controlled by setting the temperature of the stream entering the containment vessel 8. All the vapors from second reactor 32, including those fed through distributor 36b, are discharged into the dilute phase of containment vessel 8 through a single stage cyclone 36c. Employing hydrocarbon feed as a quench media is preferred as it serves dual purpose of cooling the products from second reactor 32 and also enhances the production of middle distillates, such as via cracking of the heavy hydrocarbon quench media in during transport to distributor 36b. In some embodiments, the quench media may be introduced proximate the outlet of the countercurrent flow reactor. The temperature within transport pipe 36a may be controlled by varying the amount of hydrocarbon fed via flow line 36b, the rate of which may be measured with a flow transmitter (FT).

The first stage reactor, riser reactor 3, operates in the fast fluidization regime (e.g., at a gas superficial velocity in the range from about 3 to about 10 m/s at the bottom section) and pneumatic transport regime (e.g., at a gas superficial velocity in the range from about 10 to about 25 m/s) in the top section.

Second reactor 32 operates in a bubbling/turbulent regime (e.g., at a gas superficial velocity in the range from about 0.01 to about 1.0 m/s) with a catalyst bed density in the range from about 480 kg/m$^3$ to about 800 kg/m$^3$. WHSV in second reactor 32 is typically in the range from about 0.5 h$^{-1}$ to about 50 h$^{-1}$; vapor and catalyst residence times may vary from about 2 to about 20 seconds. The height H1 of the stripper bed is typically 1 to 5 times the diameter (D2) of second countercurrent flow reactor 32. The height H2 of the active catalyst bed available for $C_4$/naphtha feed reaction is 2 to 10 times D2, which is located above the stripper bed 32a. The height H3 of the catalyst separation zone is typically 1 to 5 times the diameter (D2) of second countercurrent flow reactor 32. The difference in the location of $C_4$ feed and naphtha feed is 1 to 7 times D2 or 2 to 7 times D1 from the bottom tangent line of second reactor vessel 32. Preferably, $C_4$ feed is injected at an elevation below naphtha feed injection. However, interchanging of feed injection locations is possible, and the feed location may depend on target products desired. Depending on the product objectives and residence time requirements, the diameter (D2) of the second reactor vessel may be 1 to 3 times of the diameter (D1) of stripper bed 32a.

Regenerator 17 operates in a conventional turbulent flow regime having a superficial gas velocity in the range of 0.5 to 1.2 m/s with a bed density in the range of 400 to 600 kg/m$^3$.

As necessary, make-up catalyst may be introduced via one or more flow lines 42, 43. For example, make-up FCC or Y-type zeolite catalyst or a mixture of these two may be introduced to regenerator 17 via flow line 42 and make-up ZSM-5/ZSM-11 catalyst may be introduced to second reactor 32 via flow line 43.

The countercurrent flow reactor may be equipped with baffles or structured internals such as modular grids as described in U.S. Pat. No. 7,179,427. Other types of internals that enhance contact efficiency and product selectivity/yields can also be utilized. The internals may enhance the catalyst distribution across the reactor and improve the contact of feed vapors with catalyst, leading to an increase in the average reaction rate, enhance the overall activity of the catalyst and optimize the operating conditions to increase the production of light olefins.

Embodiments disclosed herein use Y-type zeolite or conventional FCC catalyst, maximizing the conversion of heavy hydrocarbon feeds. The Y-type zeolite or FCC catalyst is of a smaller and lighter particle size than the ZSM-5 or similar catalysts used to enhance the production of light olefins in the countercurrent flow reactor. The ZSM-5 or similar catalysts have a larger particle size and denser than the Y-type zeolite or FCC catalysts used to preferably maintain a catalyst bed of ZSM-5 in the countercurrent flow reactor. The superficial gas velocity of vapors in the second reactor is maintained such that it allows entrainment of the Y-type zeolite or FCC catalyst out of the countercurrent flow reactor, utilizing the differences in single particle terminal velocities or differences between minimum fluidization minimum bubbling velocities. This concept allows the elimination of two stage FCC systems and hence a simplified and efficient process. The catalysts employed in the process could be either a combination of Y-type zeolite/FCC catalyst and ZSM-5 or other similar catalysts, such as those mentioned in U.S. Pat. Nos. 5,043,522 and 5,846,402.

Another benefit of embodiments disclosed herein is that the integrated two-reactor scheme overcomes the heat balance limitations in the stand alone $C_4$/naphtha catalytic cracking processes. The countercurrent flow reactor acts as a heat sink due to integration with the catalyst regenerator, minimizing the requirement of catalyst cooler while processing residue feed stocks.

The product vapors from the countercurrent flow reactor are transported into the first stage reactor/disengaging vessel or reaction termination device wherein these vapors are mixed and quenched with the products from the first stage and or external quench media such as LCO or steam to minimize the unwanted thermal cracking reactions. Alternatively, the product outlet line of the countercurrent flow reactor can also be used to introduce additional quantity of heavy feed or re-route part of the feed from the first stage reactor (the riser reactor). This serves two purposes: (1) the catalyst in the countercurrent flow reactor vapor outlet line is predominantly Y-type zeolite/conventional FCC catalyst that is preferred to crack these heavy feed molecules into middle distillates, and (2) such cracking reaction is endothermic that helps in reducing the temperature of the outgoing product vapors and also residence time.

In some embodiments disclosed herein, an existing FCC unit may be retrofitted with a countercurrent flow reactor. For example, a properly sized reactor may be fluidly connected to an existing catalyst regeneration vessel to provide catalyst feed and return from the countercurrent flow vessel, and fluidly connected to an existing disengagement vessel to separate the hydrocarbon products and catalysts. In other embodiments, a countercurrent flow reactor may be added to a grass-roots FCC unit that is aimed at operating in gasoline mode, light olefins mode, or diesel mode.

As described above, a countercurrent flow bubbling bed or turbulent bed reactor with appropriate baffles or internals is integrated with a FCC riser reactor and separation system. This countercurrent flow reactor is in flow communication with other vessels, allowing selective catalytic cracking and integrated hydrocarbon product quenching, separation and catalyst regeneration.

Such an integrated reactor system offers one or more of the following advantages. First, countercurrent flow of catalyst and light hydrocarbon feed (feed streams from C4 olefins to naphtha) may provide an optimal and uniform temperature profile across the reaction zone and availability of active catalyst sites (contacting regenerated catalyst as the reactants move upward through the reaction zone), which increases average reaction rate. Due to the endothermic nature of the cracking reactions, the temperature decreases along the length of the reactor, but the hot regenerated catalyst counterbalances the heat input. In effect, the countercurrent flow reaction indirectly aids in maintaining uniform temperature along the length of the reactor. The reactor configuration produces a high yield of light olefins by way of increased average reaction rate and activity of the catalyst. This reactor may be operated at significantly higher reaction temperatures to meet the requirement of high activation energy to crack such lighter feeds.

Second, the second reactor may be provided with baffles or modular grid internals. These baffles/internals may provide for intimate contact of catalyst with the hydrocarbon feed molecules, resulting in bubble breakage and avoiding bubble growth due to coalescence as well as channeling or bypassing of either catalyst or feed. Reactor baffles/internals help in better mixing, distribution, and contact of hydrocarbon feed and catalyst, improving the selectivity to desired light olefin products while minimizing dry gas and coke formation.

Third, the reactor arrangement is such that reaction and stripping may be performed in a single vessel. The stripping is carried out in the bottom portion of the countercurrent flow reactor. The stripping steam flows up into the upper part of reaction section and acts as a diluent to control partial pressure of hydrocarbons.

Sectionalized injection of hydrocarbon feed streams to the countercurrent flow reactor may also help maintain a desired WHSV that is optimal for each respective feedstock. For example, a $C_4$ hydrocarbon feed stream requires a lower WHSV while a naphtha feed requires a relatively higher WHSV.

The product vapors from the countercurrent flow reactor are also advantageously routed to the first (riser) reactor top, which may reduce the temperature of products from the countercurrent flow reactor due to quenching with those at lower temperature from riser reactor. These cracked hydrocarbon products can also be further quenched using light cycle oil (LCO) and/or quench steam within the first stage reactor vessel. The first stage riser termination device is also used to quickly separate product vapors and route them to a product recovery section, thereby advantageously reducing unwanted thermal cracking reactions and improving product selectivity.

Processes disclosed herein also advantageously use two types of catalyst particles, such as Y-zeolite/FCC catalyst of smaller particles with less density and ZSM-5 particles of larger size and higher density. This allows entrainment of hater and smaller particles in the catalyst separation zone of the countercurrent flow reactor, thereby retaining ZSM-5 type particles in the reaction zone of the countercurrent reactor. The lighter hydrocarbon feed thus undergoes selective catalytic cracking in the presence of the ZSM-5 type catalyst to maximize the yield of light olefins. The adverse effects of catalyst deactivation in the prior art due to firing of torch oil in the regenerator to maintain heat balance are also averted.

Although less coke is produced from the countercurrent flow reactor, integration of the countercurrent flow reactor with an FCC unit reactor-regeneration system eliminates the heat balance problems encountered in the prior art. As a result, embodiments disclosed herein may advantageously provide an opportunity to increase residue content in the heavy feed to the first stage riser reactor as the countercurrent flow reactor helps in removing excessive heat from the regenerator. The use of the countercurrent flow reactor may also negate the need for use of a catalyst cooler while processing residues.

Embodiments disclosed herein also contemplate separation of aromatics from naphtha range products before recycle to the countercurrent flow reactor. Similarly, $C_4$ streams following separation from $C_3/C_4$ mixtures may be recycled to the countercurrent flow reactor. These steps may help in reducing the size of countercurrent flow reactor and improving per pass conversion.

Countercurrent flow reactors, as described herein, may be easily inserted into an existing FCC units operating in gasoline mode, light olefins mode, or diesel mode, providing additional capacity, operating flexibility, and overall improved operations and light olefins production. The combined features of a countercurrent flow reactor coupled with reactor internals greatly enhance the conversion and selectivity to desired products.

Depending on the product slate requirements, the countercurrent flow reactor may also be easily isolated on-line with steam, without requiring unit shutdown, allowing the riser reactor, catalyst regenerator, and disengagement vessel to continue operations.

Conventionally, fresh catalyst make-up for maintaining the catalyst activity is introduced to regenerator bed using plant air. In contrast, embodiments disclosed herein may advantageously inject fresh ZSM-5 type catalyst directly into the second reactor bed using steam or nitrogen as conveying media, producing incremental light olefins yields.

The countercurrent flow reactor may also provide flexibility and operating window to adjust operating conditions such as weight hourly space velocity (WHSV), catalyst and hydrocarbon vapor residence time, reaction temperature, catalyst to oil ratio, etc. For example, the countercurrent flow reactor top/bed temperature may be controlled by adjusting catalyst flow from the catalyst regenerator, which indirectly controls the catalyst/oil ratio. Reactor bed level may be controlled by manipulating the spent catalyst flow from reactor to regenerator, which controls the WHSV and catalyst residence time.

One or more of the above advantages and features of embodiments of the processes disclosed herein may provide for an improved process for the catalytic cracking of hydrocarbons for light olefin production.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed:

1. An apparatus for the catalytic cracking of hydrocarbons, comprising:
   a catalyst regeneration vessel for regenerating a spent catalyst comprising a first cracking catalyst having a first average particle size and density and a second cracking catalyst having a second average particle size and density to form a regenerated catalyst comprising the first cracking catalyst and the second cracking catalyst, wherein the average particle size of the first cracking catalyst is less than the average particle size of the second cracking catalyst;
   a riser reactor for contacting in co-current flow a first hydrocarbon feed with a first portion of the regenerated catalyst to produce a first effluent comprising a first cracked hydrocarbon product and a spent mixed catalyst fraction;
   a flow conduit for feeding a second portion of the regenerated catalyst to a second cracking reactor;
   the second cracking reactor configured to concurrently:
      separate the first cracking catalyst from the second cracking catalyst based on at least one of density and particle size;
      react a second hydrocarbon feed to produce a second cracked hydrocarbon product;
      recover a second effluent from the second cracking reactor comprising the second cracked hydrocarbon product and the first cracking catalyst, recovered via a flow line at an upper portion of the second cracking reactor; and recover a third effluent comprising spent second catalyst, recovered via a flow line from a bottom of the second cracking reactor;

a disengagement vessel for separating the first effluent and the second effluent to recover (a) a spent catalyst fraction comprising the spent mixed catalyst fraction and the separated first cracking catalyst and (b) an effluent comprising the first and second cracked hydrocarbon products;

a flow conduit for feeding the spent catalyst fraction from the disengagement vessel to the catalyst regeneration vessel.

2. The apparatus of claim 1, wherein the disengagement vessel comprises:

a first stage cyclone for separating a first portion of the mixed catalyst from the cracked hydrocarbons in the first effluent; and a second stage cyclone for separating a second portion of the mixed catalyst from the cracked hydrocarbons in the first effluent and for separating the separated first cracking catalyst from the cracked hydrocarbons in the second effluent.

3. The apparatus of claim 1, further comprising a flow conduit for feeding fresh or make-up first cracking catalyst to the catalyst regeneration vessel.

4. The apparatus of claim 1, further comprising a flow conduit for feeding fresh or make-up second cracking catalyst to the second cracking reactor.

5. The apparatus of claim 1, wherein the second cracking reactor comprises at least one of baffles and structured internals for intimating contact of the second cracking catalyst and the second hydrocarbon feed and for reducing or minimizing channeling, bubble growth, or coalescence.

6. The apparatus of claim 1, further comprising a catalyst standpipe and a J-bend conduit, wherein the catalyst standpipe provides for catalyst transport from the catalyst regeneration vessel and the J-bend conduit, which is in fluid communication with the riser reactor.

7. The apparatus of claim 6, further comprising a hydrocarbon feed location upstream of a feed location of the first hydrocarbon feed to introduce a hydrocarbon feed to the J-bend conduit.

8. The apparatus of claim 6, wherein a diameter of the J-bend conduit is 1 to 3 times a diameter of the catalyst standpipe.

9. The apparatus of claim 1, further comprising an air feed line for mixing air with the third effluent comprising spent second catalyst recovered from the bottom of the second cracking reactor.

10. The apparatus of claim 9, the catalyst regeneration vessel further comprising an inlet for receiving the mixture of air and spent second catalyst.

11. The apparatus of claim 1, further comprising valves, located on one or more of the second hydrocarbon feed and a steam flow to the lower stripping zone, configured to maintain a superficial gas velocity of vapors in the second cracking reactor to entrain the first cracking catalyst into the flow line at the upper portion of the second cracking reactor and to the disengagement vessel.

12. An apparatus for the catalytic cracking of hydrocarbons, comprising:

a catalyst regeneration vessel for regenerating a spent catalyst comprising a first cracking catalyst having a first average particle size and density and a second cracking catalyst having a second average particle size and density to form a regenerated catalyst comprising the first cracking catalyst and the second cracking catalyst, wherein the average particle size of the first cracking catalyst is less than the average particle size of the second cracking catalyst;

a riser reactor for contacting in co-current flow a first hydrocarbon feed with a first portion of the regenerated catalyst to produce a first effluent comprising a first cracked hydrocarbon product and a spent mixed catalyst fraction;

a flow conduit for feeding a second portion of the regenerated catalyst to a second cracking reactor;

the second cracking reactor comprising:
a lower stripping zone, an intermediate reaction zone, and an upper catalyst separation zone;
one or more hydrocarbon feed distributors for introducing a second hydrocarbon stream into the intermediate reaction zone;
a steam distributor for feeding steam into the lower stripping zone;
the steam distributor and the one or more hydrocarbon feed distributors located and configured to introduce steam and hydrocarbon, respectively, to collectively:
entrain the first cracking catalyst into a flow line at an upper portion of the second cracking reactor and to a disengagement vessel; and
form a bed of second cracking catalyst within a bottom portion of the second cracking reactor;

the flow line at the upper portion of the second cracking reactor for transporting an effluent comprising cracked hydrocarbons and the first cracking catalyst to the disengagement vessel;

a flow line for recovering a third effluent comprising spent second cracking catalyst from the bottom portion of the second cracking reactor for transporting the spent second catalyst to the catalyst regeneration vessel;

the disengagement vessel for separating the first effluent and the second effluent to recover (a) a spent catalyst fraction comprising the spent mixed catalyst fraction and the separated first cracking catalyst and (b) an effluent comprising the first and second cracked hydrocarbon products;

a flow conduit for feeding the spent catalyst fraction from the disengagement vessel to the catalyst regeneration vessel.

13. The apparatus of claim 12, wherein a height of the stripping zone is in the range from 1 to 2 times a diameter of the second cracking reactor.

14. The apparatus of claim 12, wherein a height of the intermediate reaction zone is in the range from 2 to 10 times a diameter of the second cracking reactor.

15. The apparatus of claim 12, further comprising an air feed line for mixing air with the third effluent downstream of the second cracking reactor and upstream of the catalyst regeneration vessel.

16. The apparatus of claim 12, wherein the stripping zone has a height H1 and an internal diameter D1, and the intermediate reaction zone has a height H2 and an internal diameter D2, wherein D2 is equal to or greater than D1.

17. The apparatus of claim 16, wherein
height H1 is 1 to 5 times the diameter D2;
height H2 is 2 to 10 times the diameter D2;
diameter D2 is greater than 1 up to 3 times the diameter D1.

18. The apparatus of claim 16, wherein the one or more hydrocarbon feed distributors for introducing a second hydrocarbon stream into the intermediate reaction zone comprise a first distributor for introducing a C4 hydrocarbon feed and a second distributor for introducing a naphtha feed.

19. The apparatus of claim 18, wherein the first distributor is disposed below the second distributor.

20. The apparatus of claim 19, wherein the first distributor is disposed at a height differential with respect to the second distributor in the range from 1 to 7 times D2.

* * * * *